(12) United States Patent
Vezzoli et al.

(10) Patent No.: US 9,387,904 B2
(45) Date of Patent: Jul. 12, 2016

(54) HYDRAULIC PUMP

(71) Applicant: FORMULA S.R.L., Prato (IT)

(72) Inventors: Giancarlo Vezzoli, Brescia (IT); Gabriele Di Pietro, Pistoia (IT); Samuele Laghi, Prato (IT); Marco Fiesoli, Campi Bisenzio (IT)

(73) Assignee: FORMULA S.A.S. DI "FORMULA GROUP S.R.L." & C., Prato (IT)

( * ) Notice: Subject to any disclaimer, the term of this patent is extended or adjusted under 35 U.S.C. 154(b) by 0 days.

(21) Appl. No.: 14/279,862

(22) Filed: May 16, 2014

(65) Prior Publication Data

US 2014/0360829 A1    Dec. 11, 2014

Related U.S. Application Data

(62) Division of application No. 12/515,625, filed as application No. PCT/IB2008/000227 on Jan. 24, 2008, now Pat. No. 8,764,125.

(30) Foreign Application Priority Data

Jan. 31, 2007   (IT) ................................ FI2007A0018

(51) Int. Cl.
*B60T 11/22*     (2006.01)
*B62L 3/02*      (2006.01)
*B60T 11/16*     (2006.01)
*B60T 11/10*     (2006.01)

(52) U.S. Cl.
CPC ................. *B62L 3/023* (2013.01); *B60T 11/22* (2013.01); *B60T 11/10* (2013.01); *B60T 11/165* (2013.01)

(58) Field of Classification Search
CPC ......... B60T 11/22; B60T 11/10; B60T 11/14; B60T 11/165; B62L 3/023
USPC .......... 303/10; 188/24.11, 151 R, 344, 24.22, 188/26; 60/565, 581, 583, 584, 587–589, 60/594; 74/501.5 H, 500.5, 502.2, 503; 417/490, 501, 547
See application file for complete search history.

(56) References Cited

U.S. PATENT DOCUMENTS

| | | | | |
|---|---|---|---|---|
| 6,370,877 | B1 * | 4/2002 | Lin | 60/588 |
| 6,804,961 | B2 * | 10/2004 | Lumpkin | 60/588 |
| 7,178,646 | B2 * | 2/2007 | Lumpkin | 188/344 |
| 7,197,875 | B2 * | 4/2007 | Henifin | 60/584 |
| 7,360,632 | B2 * | 4/2008 | Laghi | 188/344 |
| 7,546,909 | B2 * | 6/2009 | Campbell et al. | 188/24.22 |
| 7,757,488 | B2 * | 7/2010 | Dunlap, III | 60/594 |
| 7,832,531 | B2 * | 11/2010 | Hirose et al. | 188/344 |
| 8,046,996 | B2 * | 11/2011 | Dunlap, III | 60/594 |
| 8,146,716 | B2 * | 4/2012 | Siew | B60T 11/22 188/24.22 |

(Continued)

*Primary Examiner* — Thomas Irvin
(74) *Attorney, Agent, or Firm* — McGlew and Tuttle, P.C.

(57) ABSTRACT

A hydraulic pump including a containment body (2) having inside a cylindrical cavity (3) provided with a conduit (4) communicating with a hydraulic actuator and capable of holding a fluid. A piston (5) is movable in the cylindrical cavity (3) and a reservoir (12) of the fluid is in fluid communication with the cylindrical cavity (3). An actuation device (6) connected to the piston (5) move the piston (5) within the cylindrical cavity (3) to operate the hydraulic actuator. The pump also comprises structure (13) for closing or opening the connection between the reservoir (12) and the cylindrical cavity (3). The reservoir (12) is substantially lined up with the cylindrical cavity (3) along an axis of longitudinal development (X) of same cylindrical cavity (3), so as to reduce the overall dimensions and the weight of the pump.

17 Claims, 14 Drawing Sheets

(56) References Cited

U.S. PATENT DOCUMENTS

| | | | |
|---|---|---|---|
| 8,561,402 B2 * | 10/2013 | Dunlap et al. | 60/588 |
| 8,613,346 B2 * | 12/2013 | Vezzoli | 188/24.22 |
| 8,943,924 B2 * | 2/2015 | Thomas | 74/522 |
| 2015/0113977 A1 * | 4/2015 | Larequi | B60T 11/22 60/585 |
| 2015/0321725 A1 * | 11/2015 | Kariyama | B62K 23/06 74/491 |

* cited by examiner

HYDRAULIC PUMP

CROSS REFERENCE TO RELATED APPLICATIONS

This application is a divisional under 37 CFR 1.53(b) of pending prior application Ser. No. 12/515,625 filed May 20, 2009 and claims the benefit (35 U.S.C. §120 and 365(c)) of International Application PCT/IB2008/000227 filed Jan. 24, 2008, which designated inter alia the United States and which claims the priority of Italian Patent Application FI2007A000018 of Jan. 31, 2007, the entire contents of each application are incorporated herein by reference.

FIELD OF THE INVENTION

The present invention relates to a hydraulic pump for operating a hydraulic servo actuator, in particular a caliper of disc brakes for bicycles and motorcycles.

BACKGROUND OF THE INVENTION

As it is known, the disc brake comprises a disc solid to the wheel and a caliper mounted on a bracket engaged to the yoke of the motorcycle or directly on the frame and/or on the fork.

The caliper is provided with small pistons which exert a braking action on the disc by operating, for example, a pedal pump mounted in proximity of one of the motorcycle footboards.

The pump comprises a piston sliding and/or rotating within a cylinder intended to hold fluid and moved, via suitable linkages, by the driver-operated pedal.

The cylinder has an opening at a longitudinal end thereof, opposite to the piston and connected, by means of a suitable hydraulic connection, to the caliper, or servo actuator, of the rear brake. In the known calipers, the pump is further provided with a compensating reservoir exhibiting a conduit which leads on a side wall of the cylinder into two holes being in side-by-side relationship, a feeding hole and a compensating hole. The piston has two gaskets tight-seal sliding on the inner wall of the cylinder, and a central portion interposed between said gaskets and delimiting an annular compensating chamber or space. The feeding hole—when the fluid is under pressure during the motion of the piston—leads always into the compensating space, while the compensating hole opens always onto and between the ends delimiting the gaskets. The feeding hole has the function—besides allowing the expansion of the fluid in case the latter is heated up—also of recirculating a greater amount of brake fluid, as required by the wear of the pads. In fact, in the absence of the feeding hole, the pump's piston would advance upon every braking action by a minimum additional extent owing both to the wear of the pads and the exceeding stroke length that the pistons of the calipers have to perform. Instead, with the compensating mechanism, upon releasing the pressurizing control, the caliper's pistons move back by approximately the same extent ("roll back" effect of the caliper piston's gaskets) and the piston of the pump moves back to a position which does not coincide with the previous one. However, the increase in volume between the piston's main gasket and the pistons of the calipers is compensated through the feeding hole.

The volume of fluid necessary for the compensation is therefore taken usually from the reservoir through the feeding hole and, only in case of anomalous wear or knock off, from the intermediate compensating chamber between the two gaskets of the pump's piston with a lowering of the lip of the main gasket and the withdrawal of fluid from the compensating reservoir through the compensating holes disposed on the pump's float.

The Applicant has however found out that the structure of the current compensating systems is bulky and weighs heavily on the overall dimensions and weight of the pumps of known type.

Since in the field, for example, of motorcycles and bicycles—and in general in all cases where highest performance levels are sought—the current trend is to reduce weights and dimensions in order to increase the handling and performance of the means in question, the weight and dimensions of a component like the brake pump are also of great consideration.

In particular, the presence of the two holes lined up along the cylinder of the pump, and the presence of the compensating chamber located between said gaskets, is cause for a sizeable axial development of the brake pumps of known type.

A further drawback of the known systems is the limited duration of the main gasket, due to the fact that the feeding hole may have small rugs left by the manufacturing process, which require costly machining operations to remove them and, if not removed, may be cause of an early wear out the gasket, especially under operating conditions. Moreover, in the first phase of compression of the fluid held in the main chamber, the main gasket must close the feeding hole quickly, so as to prevent a portion of the fluid from returning into the reservoir and thereby nullifying the effect of part of the working stroke. Such closing is, in the known pumps, committed to the axial sliding of the piston which is solid to said main gasket, and takes place with some delay after the actuation of the pump, also according to the idle stroke.

SUMMARY OF THE INVENTION

In this context, the specific technical task of the present invention is to provided a pump, for example for disc brakes of bicycles and motorcycles, able to overcome the above cited drawbacks.

In particular, the object of the present invention is to provide a pump, for example for disc brakes of bicycles and motorcycles, which is compact and light-weight.

It is also an object of the present invention to provide a pump able to improve a steady operation and, thus, the duration of the pump, and in particular of the sealing means.

The above technical task and the specified objects are substantially achieved by a hydraulic pump comprising the technical characteristics of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
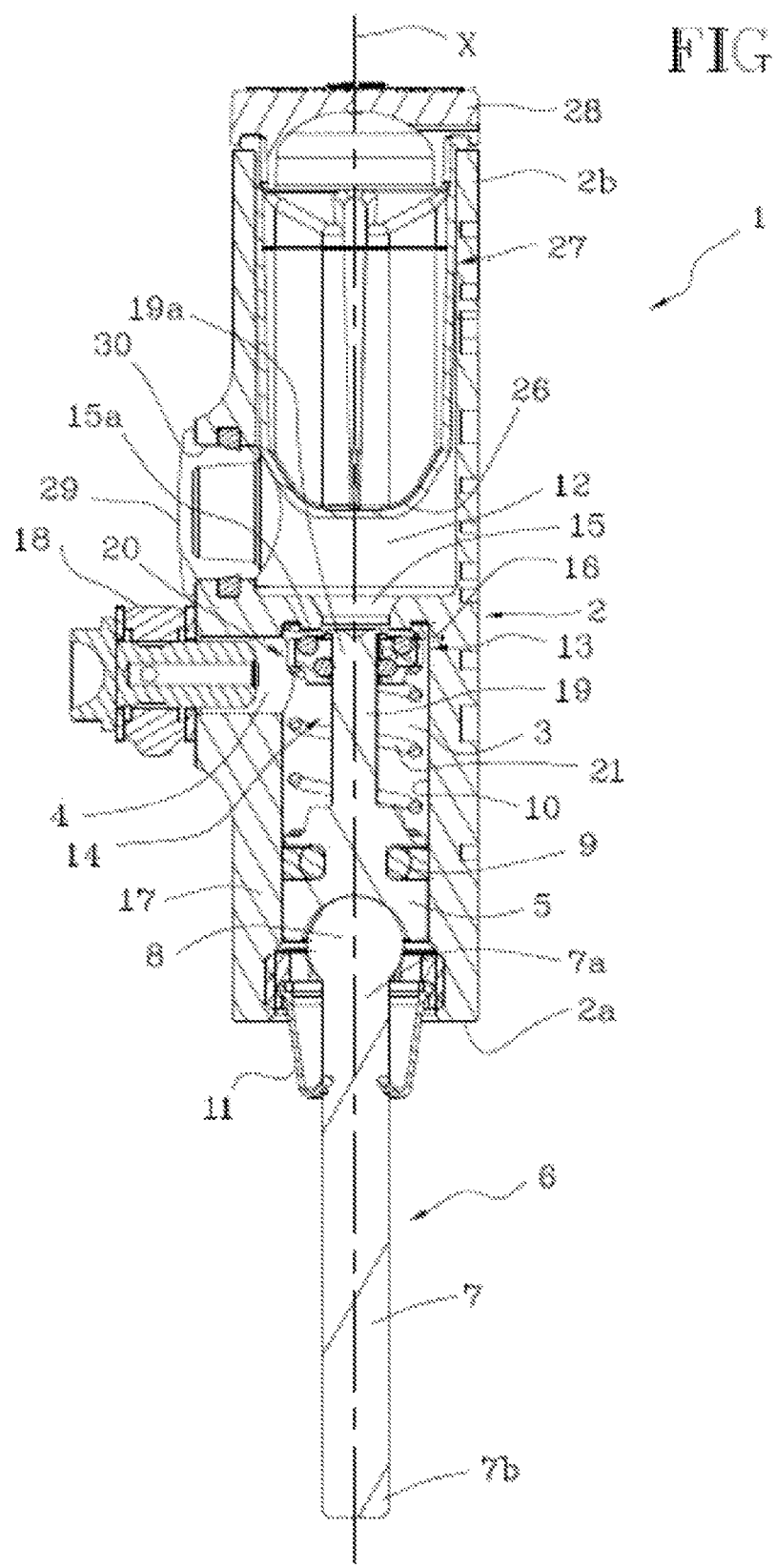
FIG. 1 is a longitudinal section view of a first embodiment of hydraulic pump, according to the invention, in a first rest position.

Referring to the drawings, numeral 1 indicates in the whole a hydraulic pump for hydraulic servo actuators such as calipers of disc brakes, according to the present invention.

In particular, shown in the attached figures is the preferred but non-limiting embodiment of a pump 1.

The pump 1 comprises a containment body 2 which delimits thereinside a cylindrical cavity 3 able to hold fluid and be in fluid communication, via a suitable conduit 4, with a hydraulic servo actuator, for example a brake caliper of a type known per se and not to be illustrated in greater detail.

Usually, the caliper is connected to the conduit 4 of the pump 1 via a hose, not shown, anchored for example at one or more points of the frame and/or at the yoke of the motorcycle.

A piston 5 is mounted in the cylindrical cavity 3 and is axially movable therein, under control of actuation means 6 connected to the piston 5 and operated by the driver, to push the fluid in the conduit 4 so as to cause a clamping of the pads onto the disc brake.

More in particular, the actuation means 6 comprise a rod 7 projecting by a first end 2a of the containment body 2 and exhibiting a first end 7a thereof connected to the piston 5, preferably through a ball joint 8.

A second end 7b of rod 7, opposite to the first 7a, can be engaged in a manner known per se to an actuation member, not shown, mounted in proximity of the motorcycle's footboard.

The piston 5 comprises a sealing means, such as a gasket 9 being slid into abutment against an inner surface 10 of the cylindrical surface 3 to ensure fluid sealing.

The pump 1 also comprises a fluid compensating reservoir 12 in fluid communication with the cylindrical cavity 3, and means 13 for closing or opening the connection between the reservoir 12 and said cylindrical cavity 3.

With reference to the embodiment shown in FIGS. 1-3a, said means 13 for closing or opening the connection between the reservoir 12 and said cylindrical cavity 3 comprise a closing device 14 movable in consequence of the displacement of piston 5 between a position for the opening and one for the closing of a port 15 allowing communication between said reservoir 12 and said cylindrical cavity 3.

Advantageously, the reservoir 12 is substantially aligned with said cylindrical cavity 3, and the port 15 opens up onto the top 16 of the cylindrical cavity 3 and lies in a position axially opposite to the first end 2a of the containment body 2. The reservoir 12 develops therefore by the opposite side of rod 8 along the axis "X", longitudinally to the cylindrical cavity 3, to the piston 5 and to the same rod 7. Moreover, as illustrated in this embodiment, also the compensating reservoir 12 is delimited by the containment body 2 which, therefore, includes as a whole both the pumping unit, cylinder 3-piston 5, and the reservoir 12.

The conduit 4 for communication with the hydraulic actuator opens up onto a side wall 17 of the containment body 2 and is in proximity of the top 16 of cavity 3 and the port 15. A connector 18 of known type is installed in said conduit 4, and the pipe (not shown) feeding the fluid to the caliper is mounted on said connector 18.

The piston 5 is movable between a rest or retracted position in which it lies close to the first end 2a of the containment body 2, and an active or advanced position in which it lies close to the top 16 of the cavity 3.

In greater detail, the closing device 14 comprises a stem 19 connected to the piston 5 and developing within the cylindrical cavity 3 along the longitudinal axis "X". The stem 19 is movable through the communication port 15 during the motion of piston 5 between the rest position and the active position.

A body 20 is slidingly and sealingly mounted around the stem 19, and elastic means 21 having preferably the form of a spiral spring are interposed between the piston 5 and body 20 to push the same body 20 toward a distal end 19a of stem 19, opposite to piston 5 and against a peripheral edge 15a of the communication port 15.

Figure 1A:
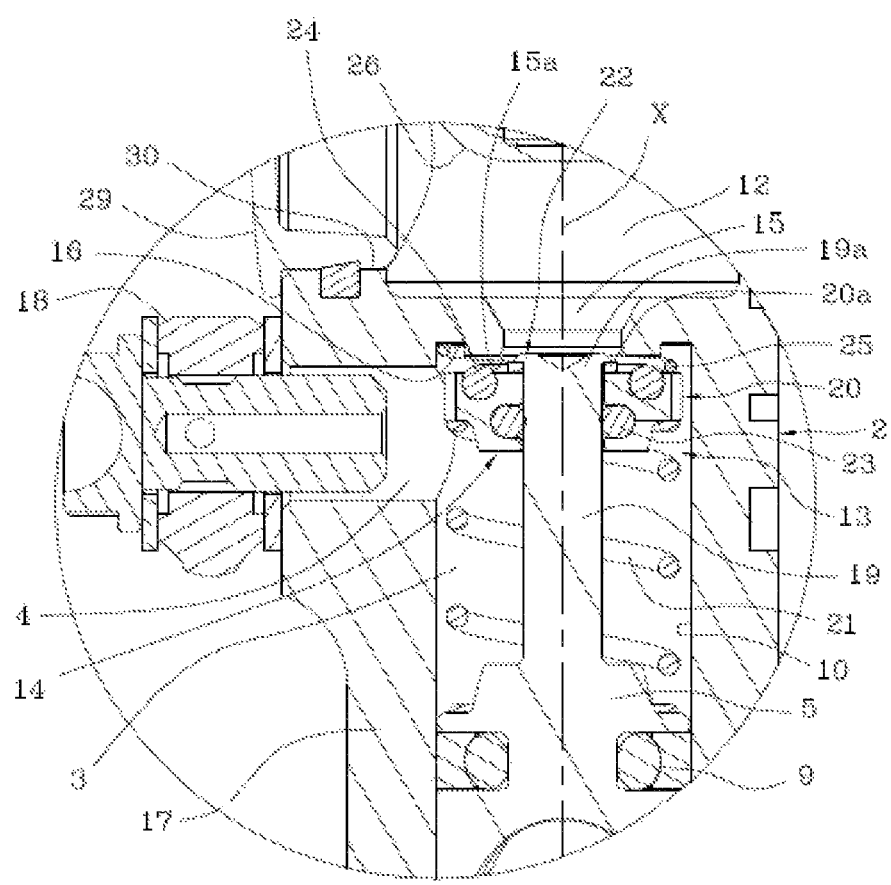
FIG. 1a is a sectional view of an enlarged portion of the pump in FIG. 1.

As best visible in FIG. 1a, the said distal end 19a has a relief 22 against which the body 20 is made to abut being pushed by the spring 21 preferably with the interposition of a spacer 20a. The body 20 is provided with a first gasket 23 mounted on an inner radial portion of same body 20 and put in sliding contact with the stem 19. A second gasket 24 is installed on a portion of the same body 20 in facing relationship with the surface 16 of cylindrical cavity 3 and surrounding the distal end 19a of stem 19. Ancillary elastic means 26 defined, in this non-limiting example, by a turn of a second spiral spring, are interposed between the body 20 and the peripheral edge 15a of communication port 15 and are able to move the body 20 away from said port 15.

When the piston 5 lies in the rest position (FIGS. 1 and 1a), the distal end 19a of stem 19 is close to the port 15, and the body 20 being pushed by the spring 21 lies in contact with the relief 22. In such position, the second gasket 24 of body 20 is spaced apart from the peripheral edge 15a of port 15, so as to delimit an annular passage between the cylindrical cavity 6 and the reservoir 12.

Figure 2:
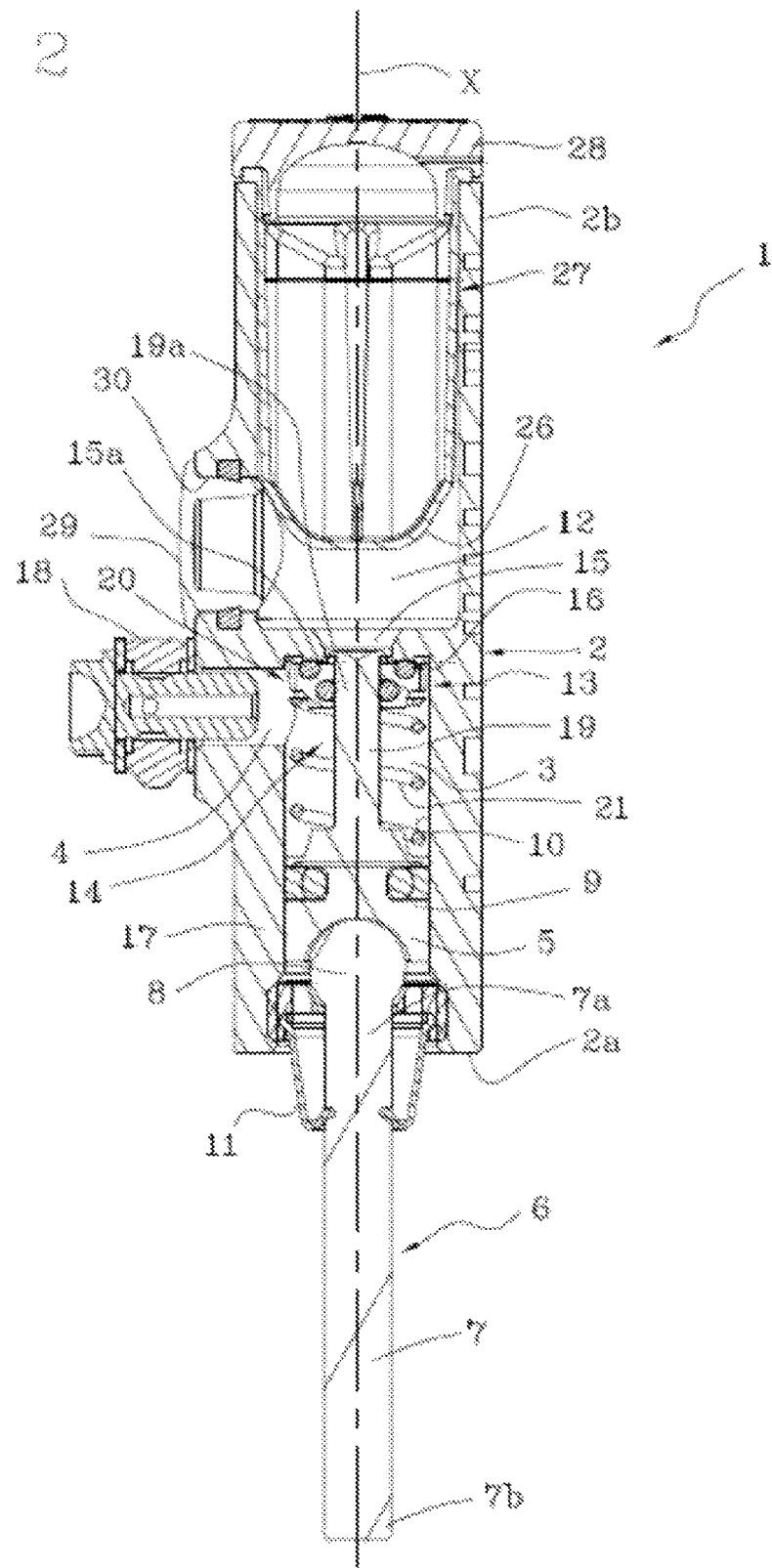
FIG. 2 is a longitudinal sectional view of the pump in FIG. 1, in a second position in which the pump is partially actuated.
Figure 2A:
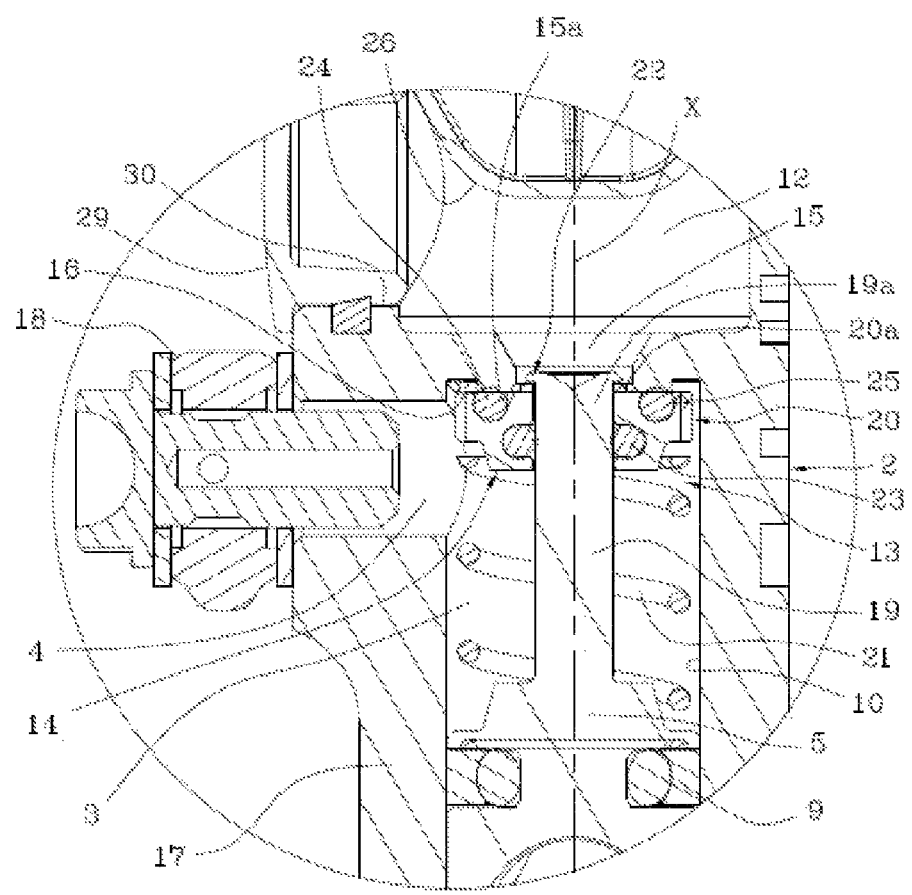
FIG. 2a is a sectional view of the enlarged portion of FIG. 1 when the pump is in the position of FIG. 2.

The thrust exerted by the driver through the rod 7 determines firstly a united movement of piston 5, stem 19 and closing body 20, thereby counteracting the second spiral spring 25. The second gasket 24 is pushed against the peripheral edge 15a of port 15 and shuts off the communication between the cylindrical cavity 3 and the reservoir 12 (FIGS. 2 and 2a). Once the communication between the cylindrical cavity 3 and the reservoir 12 is shut off, the thrust exerted by piston 5 is cause for a pressurization of the fluid present in the cavity 3 without influencing the fluid held in the reservoir 12.

Figure 3:
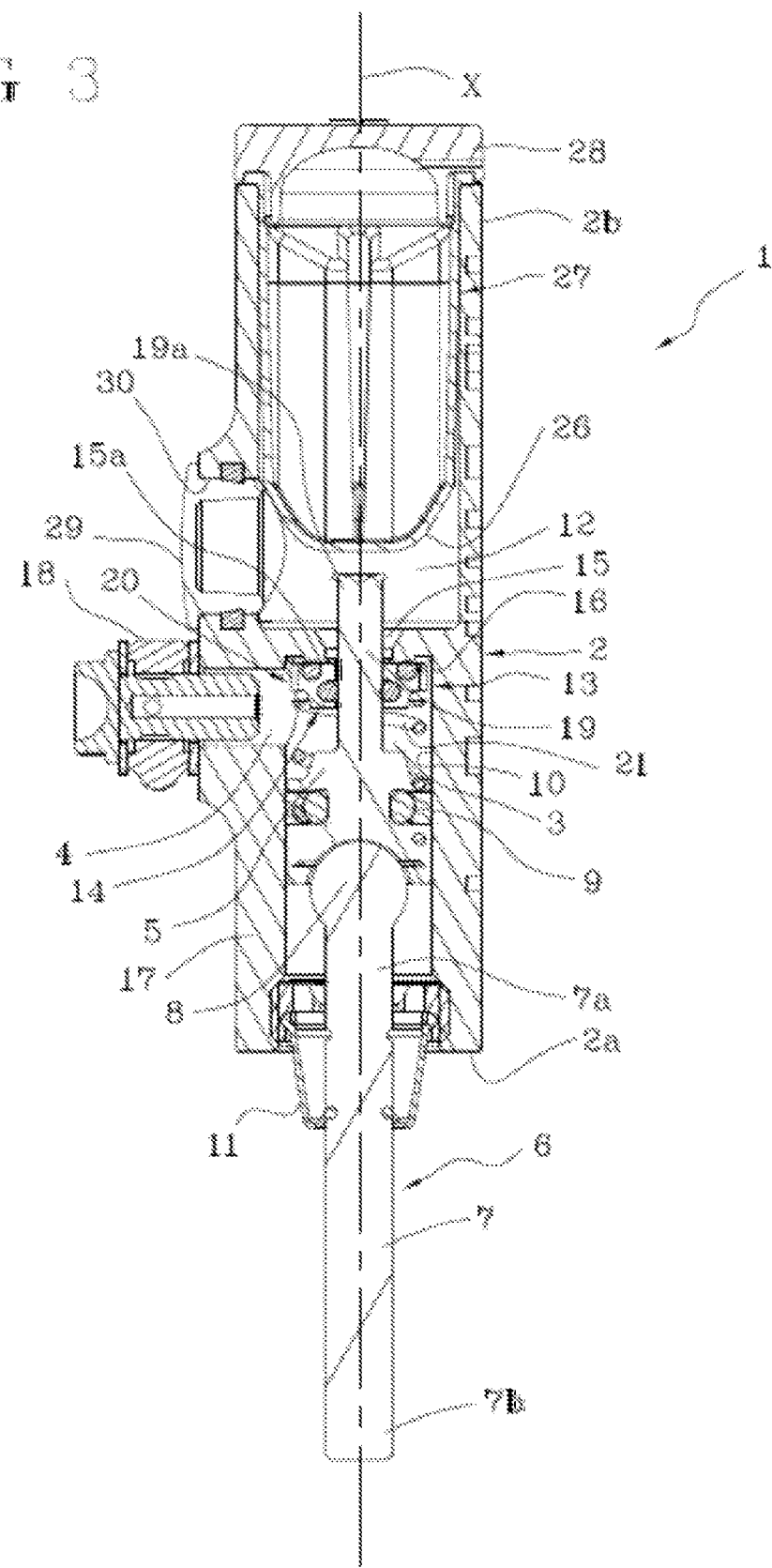
FIG. 3 is a longitudinal sectional view of the pump in FIG. 1 in a third generic work position.
Figure 3A:
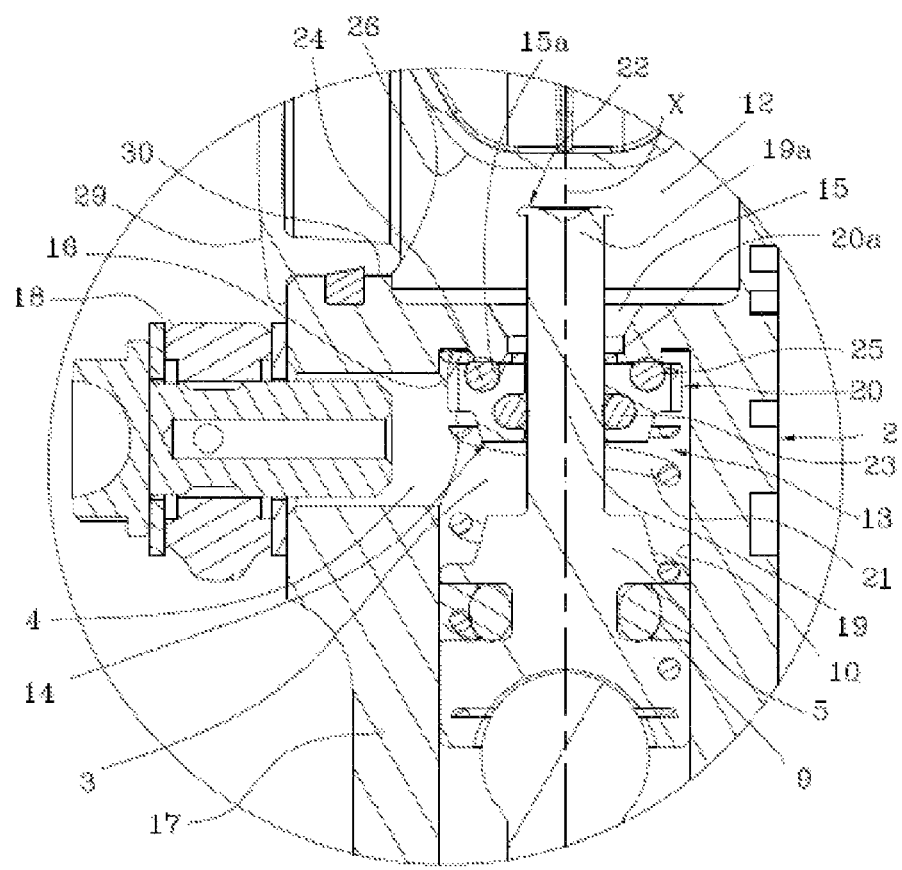
FIG. 3a is a sectional view of the enlarged portion of FIG. 1 when the pump is in the position of FIG. 3.

The further advancement of piston 5 in opposition to the first spring 21, causes a translation of stem 19 within the body 20, which remains almost steady with respect to the containment body 2, the stem 19 entering partially into the reservoir 12 (FIGS. 3 and 3a).

Upon disengaging the rod 7, the first spring 21 is of help in bringing the piston 5 back to the rest position, and the second spring 25 pushes the closing body 20 and re-opens the port 15.

To compensate for the reduction of volume, as determined by the introduction of the stem 19 into the reservoir 12 (FIGS. 3 and 3a) and the wear of the pads, the pump 1 comprises also a movable wall 26 delimiting the reservoir 12 and preferably defined by an elastic membrane. In the illustrated embodiment, said wall 26 is elastically deformable between a first position in which it lies for moving close to the port 15, and a second position in which it lies for moving away from said port 15.

More in particular, the pump 1 comprises an elastic capsule 27 inserted into a housing of the containment body 2, which housing delimits the reservoir 12 at the bottom, that is close to port 15. The capsule 27 defines the movable elastic wall 26 at the bottom and is advantageously closed on top, that is, in proximity of a second end 2b of the containment body 2, by a plug 28.

Finally, a lower plug 29 closes a side opening 30 formed in the containment body and leading into the reservoir 12. Such opening 30 has the function to control the level of fluid within the same reservoir 12.

Described herebelow with reference to FIGS. 4-6a is a second embodiment of a pump according to the present invention.

Advantageously, also in this embodiment the reservoir 12 is generally lined up with the cylindrical cavity 3.

The reservoir 12 develops therefore by the opposite side of rod 8 along the longitudinal axis "X" shared by the cylindrical cavity 3, the piston 5 and the same rod 7.

Moreover, as illustrated in this preferred embodiment, also the compensating reservoir 12 is advantageously delimited by the containment body 2 which, therefore, includes, as a whole, both the pumping unit, cylinder 3-piston 5, and the reservoir 12.

The conduit 4 in communication with the hydraulic actuator opens up onto a side wall 17 of the containment body 2 and is close to the top 16 of cavity 3.

A connector 18 is installed in such conduit 4 by means of known mechanisms, and the hydraulic connection (not shown) which feeds the fluid to the caliper is mounted on said connector 18.

Also in this solution provision is made for the piston 5 to be movable between a rest or retracted position in which it lies close to the first end 2a of the containment body 2, and an active or advanced position in which it lies close to the top 16 of cavity 3.

More in particular, the means 13 for closing or opening the connection between the reservoir 12 and the cylindrical cavity 3 also comprise a stem 19 united to the piston 5 and developing within the cylindrical cavity 3 along the longitudinal axis "X".

Figure 4:
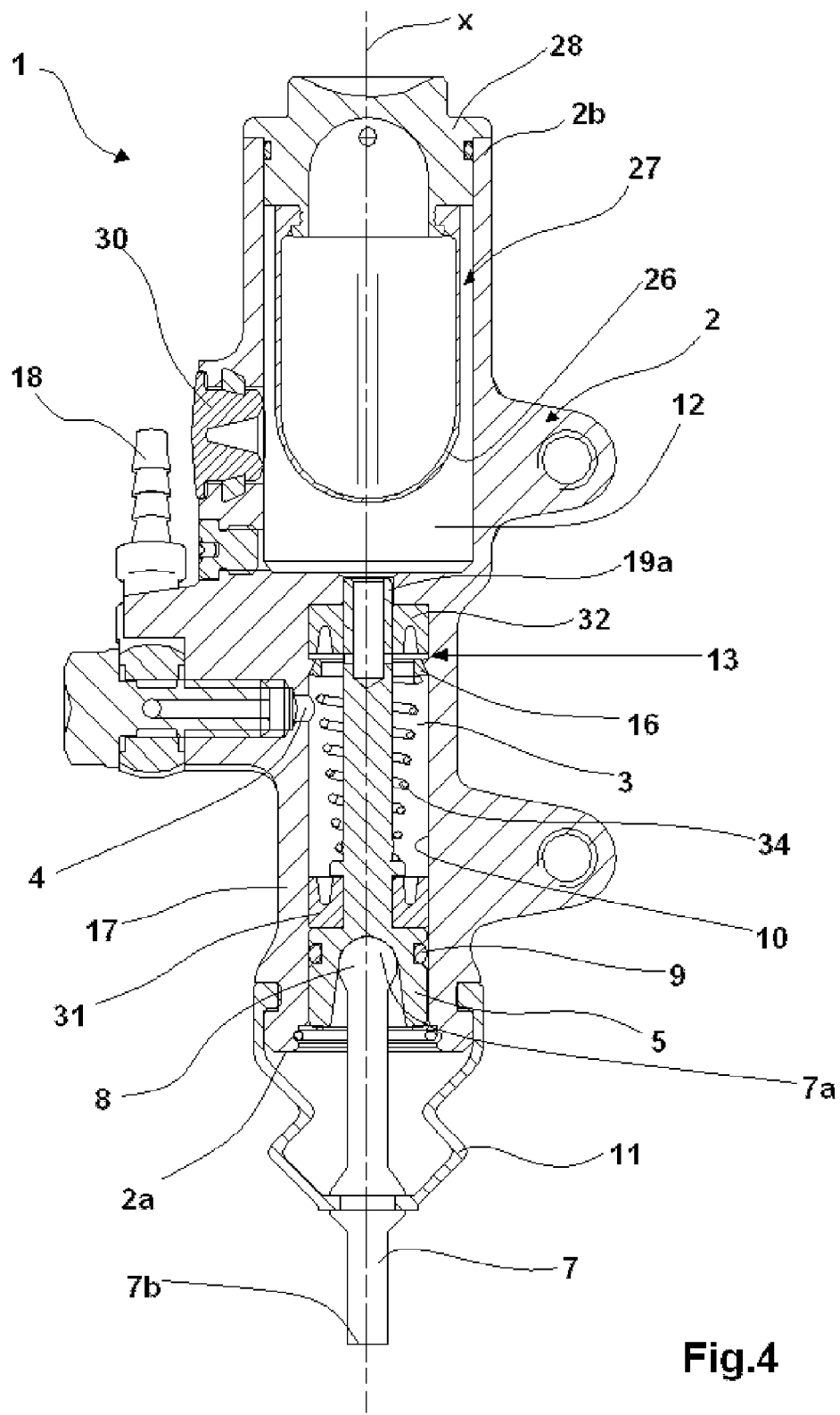
FIG. 4 is a longitudinal sectional view of a second embodiment of hydraulic pump, according to the invention, in a first rest position.
Figure 4A:
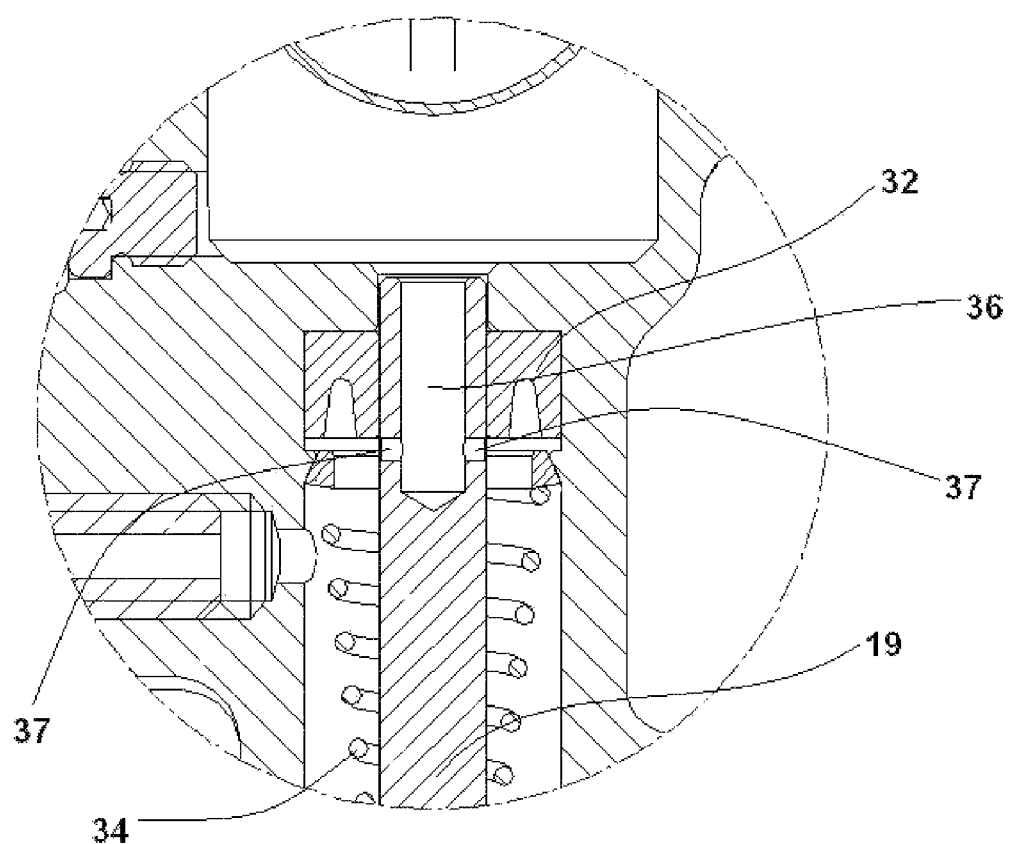
FIG. 4a is a sectional view of an enlarged portion of the pump in FIG. 4.
Figure 5:
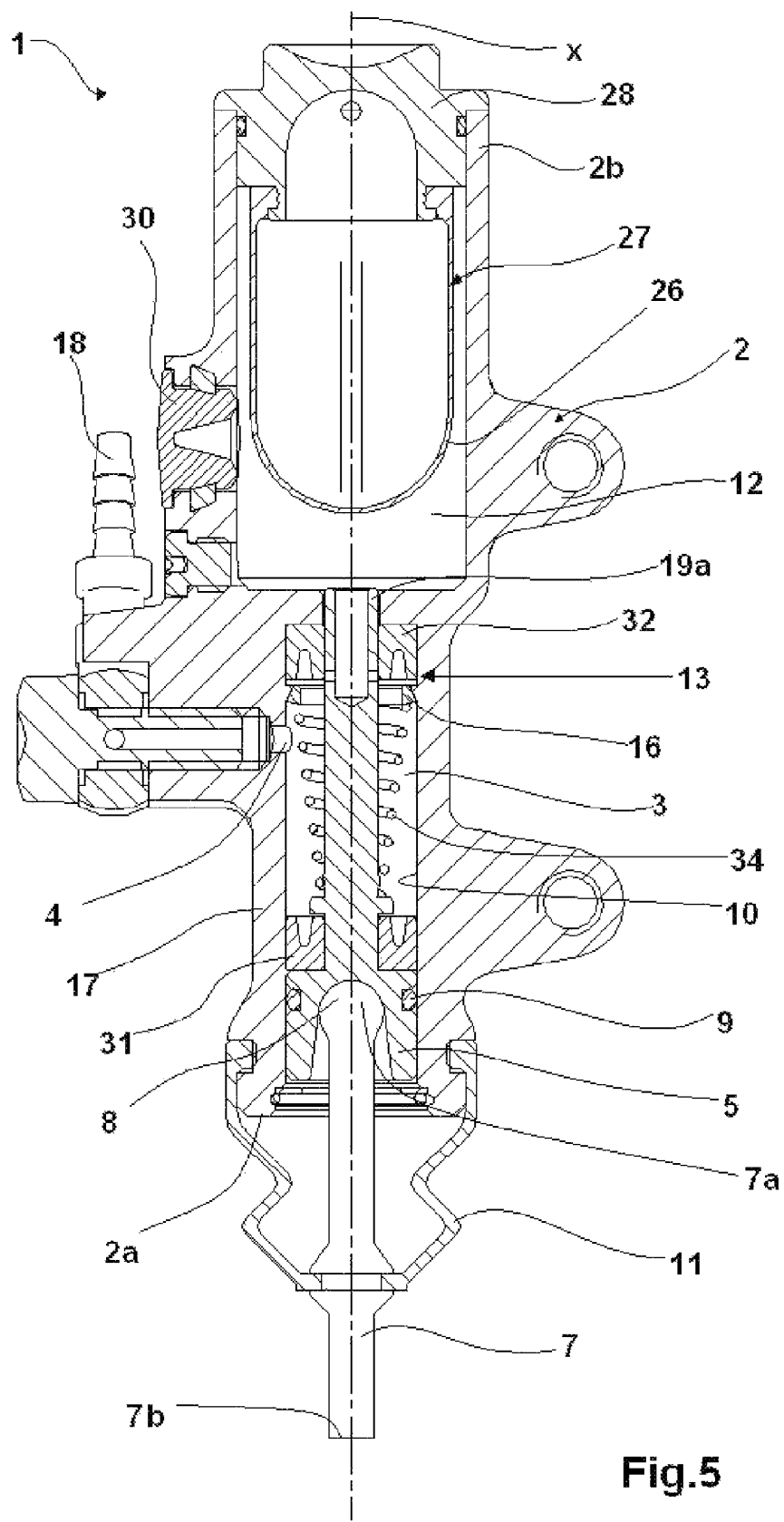
FIG. 5 is a longitudinal sectional view of the pump in FIG. 4, in a second position in which the pump is partially actuated.
Figure 5A:
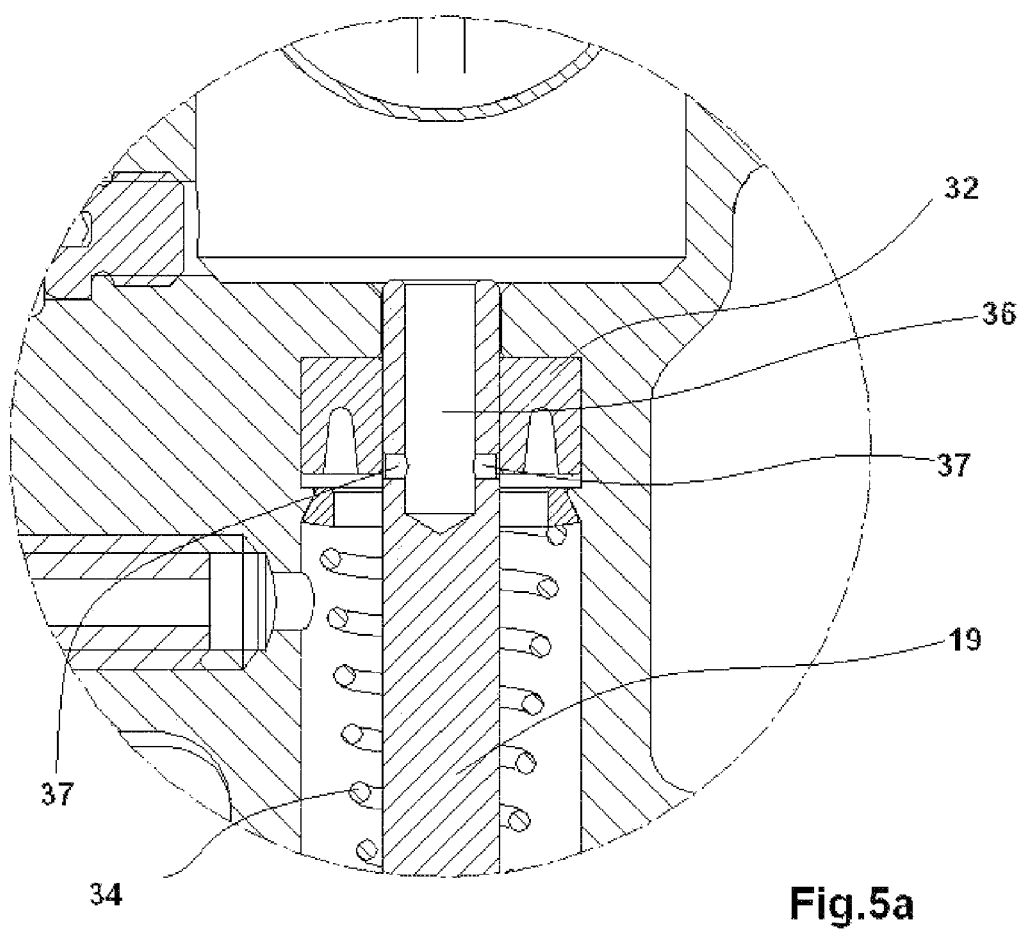
FIG. 5a is a sectional view of the enlarged portion of FIG. 5.
Figure 6:
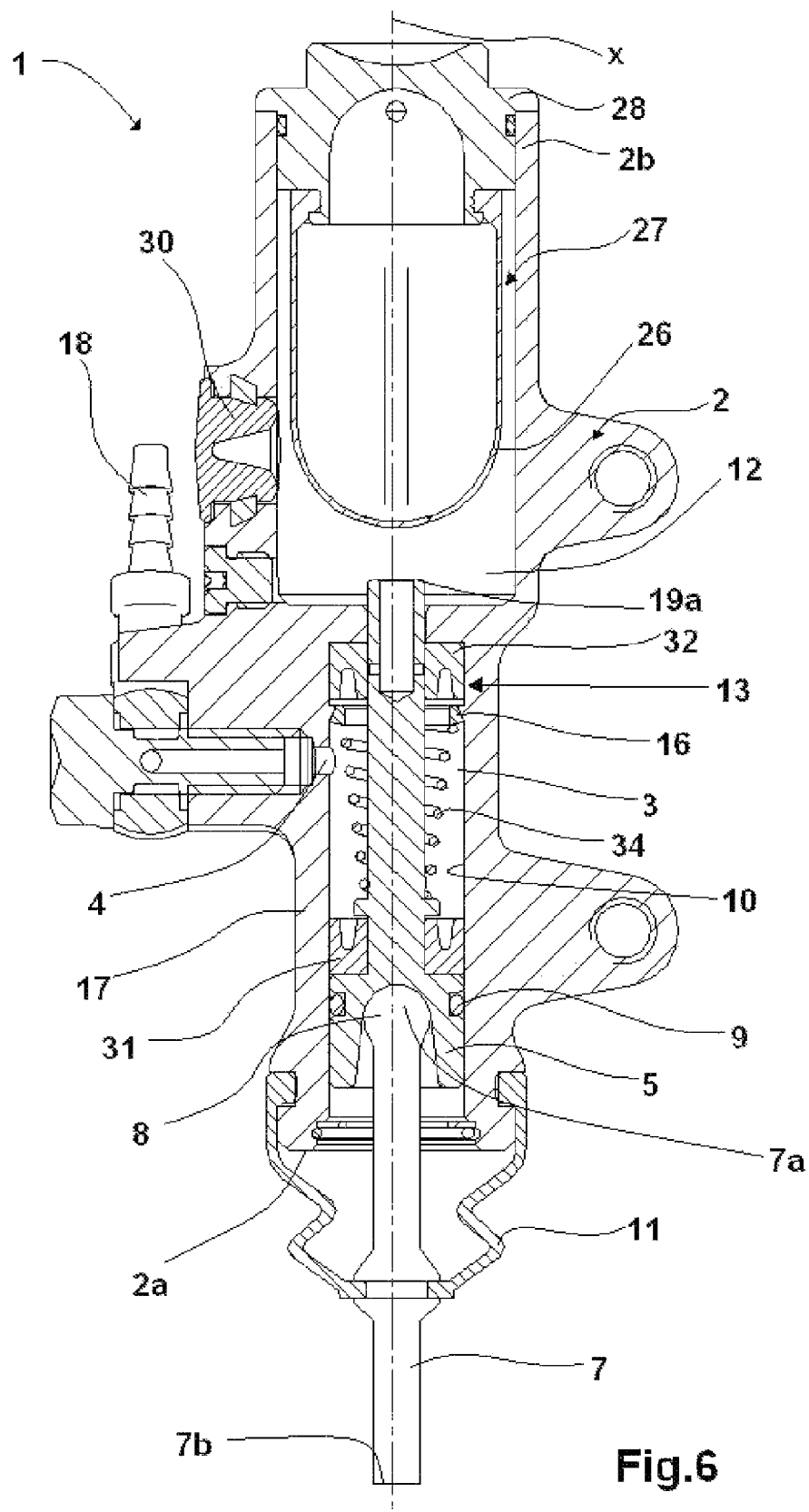
FIG. 6 is a longitudinal sectional view of the pump in FIG. 4 in a third generic work position.
Figure 6A:
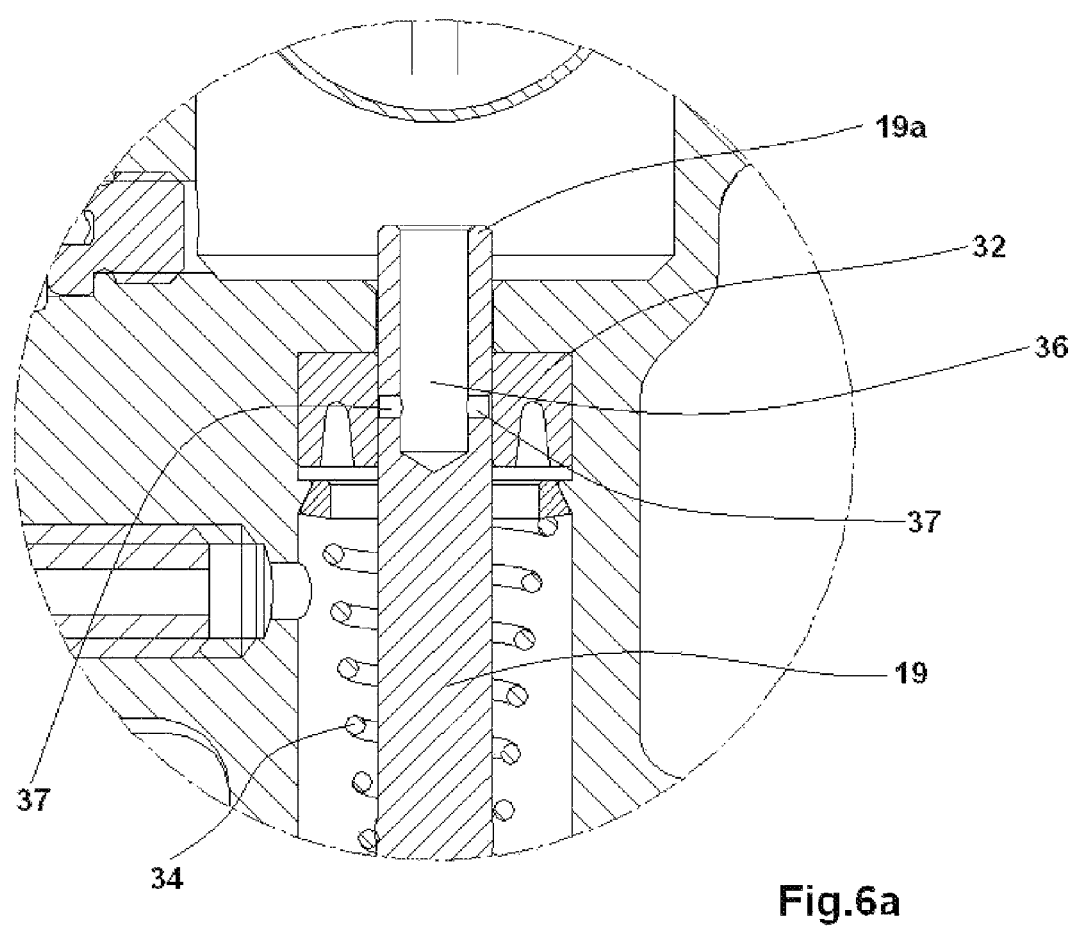
FIG. 6a is a sectional view of the enlarged portion of FIG. 6.

The stem 19 is movable during the motion of piston 5 between the rest position (FIGS. 4 and 4a) and the active position (FIGS. 6 and 6a).

In particular, in proximity of the end 19a of stem 19, away from piston 5, the stem 19 comprises a plurality of conduits 36, 37 for the passage of the fluid from the compensating reservoir 12 to the cylindrical cavity 3. As best visible in FIG. 4a, the stem has a main conduit 36, generically oriented mostly in the directions parallel to the axis "X", with which other secondary conduits 37 are connected.

This embodiment also comprises two further sealing means, for example two gaskets 31, 32, the first 31 of which is preferably mounted slidingly and sealingly around the stem 19, while the second 32 is mounted with interference on the top 16 of the cylindrical cavity 3.

The pump also comprises elastic means 34 preferably in the form of a spiral spring, which are interposed between the piston 5 and the second gasket 32, to facilitate the return of piston 5 to the rest or retracted position and to keep the gasket 32 in place.

When the piston 5 is in the rest position (FIGS. 4 and 4a), the secondary conduits 37 on the distal end 19a of stem 19 are so disposed as to put in fluid contact the compensating reservoir 12 with the cylindrical cavity 3.

The generic thrust onto the rod 7 first determines the movement of piston 5 in conjunction with the stem 19. The secondary conduits 37, being formed inside the stem 19, move along with the latter, thereby missing the fluid communication with the cylindrical cavity 3.

Once the fluid communication has been shut off, the thrust exerted by the piston 5 is used for putting the fluid in the chamber 3 under pressure, with no effect on the fluid contained in the reservoir 12.

The further advancement of piston 5 in opposition to the spring 34, causes a translation of stem 19 within the body 20 by partially penetrating into the reservoir 12 (FIGS. 6 and 6a).

Upon releasing the operating force on the rod 7, the spring 34 is of aid in bringing the piston 5 back to the rest position; thereby re-establishing the fluid communication between the reservoir 12 and cavity 3 through the main conduit 36 and the secondary conduits 37.

Also in this embodiment, in order to compensate for the reduction of volume, as determined by the introduction of the stem 19 into the reservoir 12 (FIGS. 6 and 6a), the pump 1 comprises also a wall 26 delimiting the reservoir 12 and being preferably defined by an elastic membrane.

In the illustrated embodiment, said wall 26 is elastically deformable between a first position ready for moving close to the port 15, and a second position ready for moving away from said port 15.

More in particular, the pump 1 comprises an elastic capsule 27 inserted into a housing of the containment body 2, which housing delimits the reservoir 12 at the bottom.

The capsule 27 defines the movable elastic wall 26 at the bottom and is closed on top, that is, in proximity of a second end 2b of the containment body 2, preferably by a plug 28.

Finally, advantageously, a lower plug 29 closes a side opening 30 formed in the containment body and leading into the reservoir 12.

Figure 7:
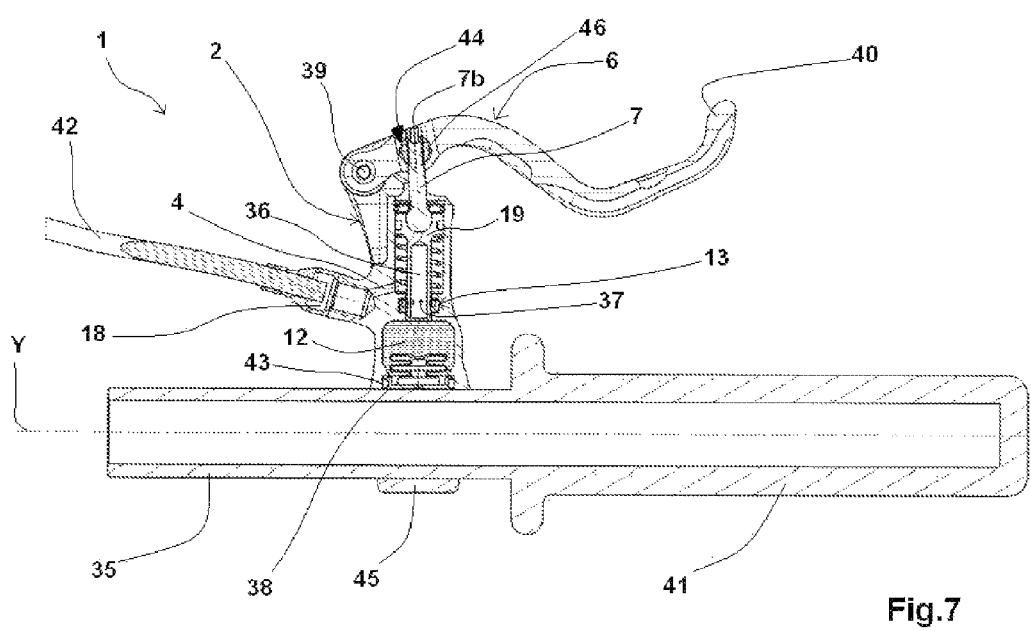
FIG. 7 is a sectional view of a possible application of a hydraulic brake according to the invention.
Figure 8:
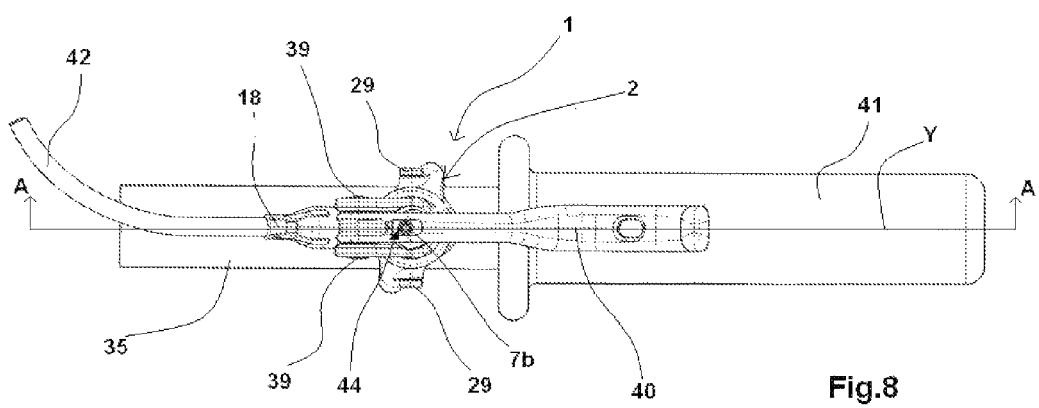
FIG. 8 is a front view of the application of FIG. 7.
Figure 9:
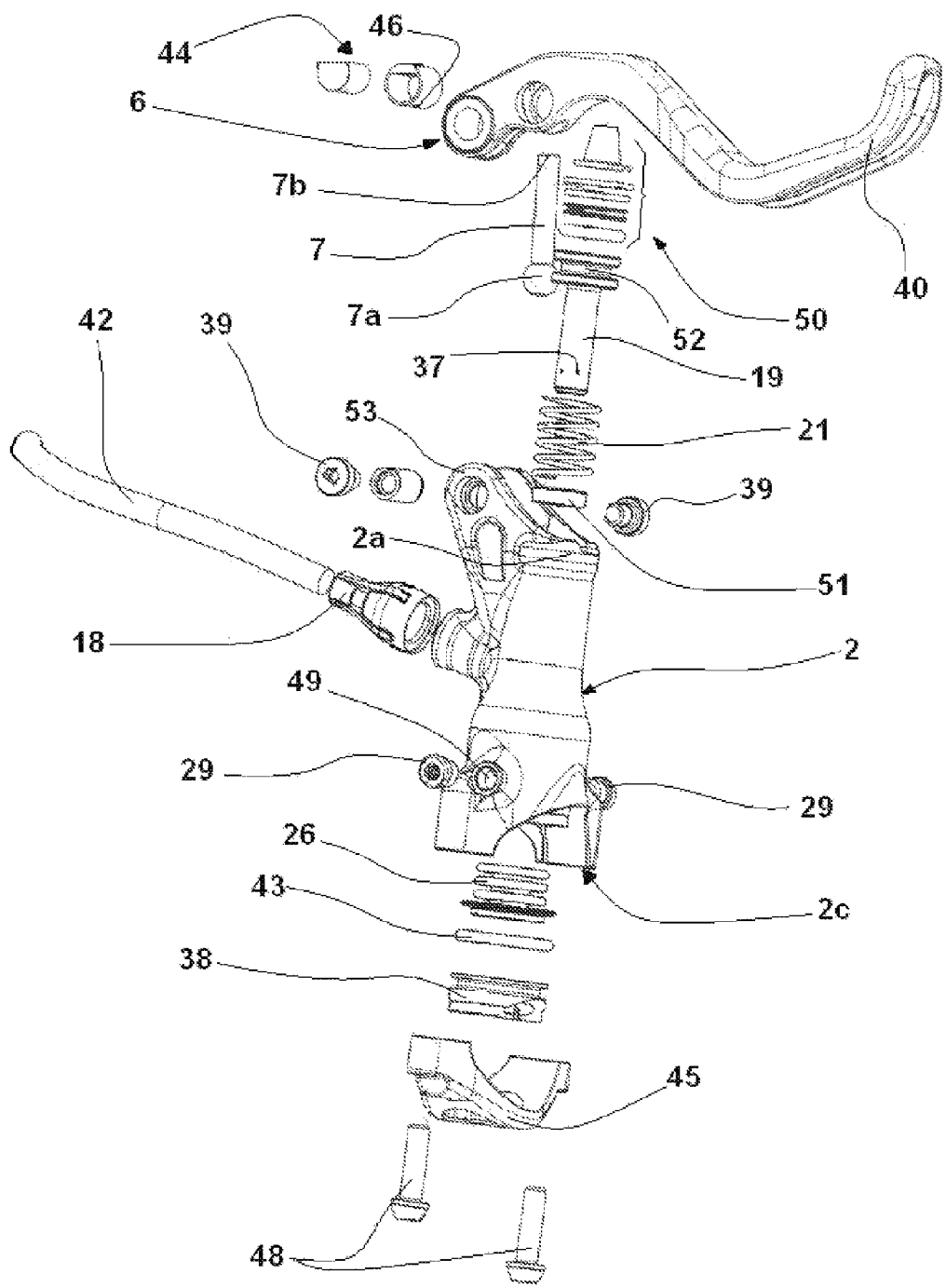
FIG. 9 is an exploded view of a hydraulic brake shown in FIGS. 7 and 8.

Described herebelow with reference to FIGS. 7-9 is a possible application of a hydraulic pump 1, according to the present invention, for making a hydraulic brake for a bicycle or motorcycle.

In this embodiment, the actuation means 6 of pumps 1 comprise the rod 7 driven by a brake's lever 40 apt to be operated by the user's hand.

As it is known, the hydraulic brakes for cycles and motorcycles can be fixed by means of suitable fastening members 48 to a handlebar 35 so as to allow the user, having one hand on a knob 41 of the handlebar, to act on the lever 40 in order to move it close to the same knob 41 and thus operating the hydraulic brake.

More in particular, the lever 40 is hinged, free to rotate, onto the containment body 2 through a relevant pivot 39 supported by a projection 52 of same body 2.

Advantageously, the rod 7 may exhibit a device 44 for adjusting the travel of lever 40 in correspondence of the end 7b of same rod 7. In this type of known-per-se adjusting device 44, the end 7b of rod 7 is externally threaded and engages into a corresponding internal thread of a cylinder 46.

By rotating the rod 7, it is possible to adjust the distance, under rest condition, between the lever 40 and the knob 41.

The hydraulic pump 1 is interposed between the handlebar 35 and the lever 40.

In particular, the compensating reservoir 12 is closed by a respective plug 38 which is kept under pressure onto a gasket 43 via a small collar 45 screwed onto the handlebar 35 by respective fastening elements 48.

More in particular, a portion 2c of the containment body 2, and the small collar 45 are so shaped as to be able to embrace the handlebar 35 and be coupled stably thereon. In this embodiment, a flexible cable 42 is fitted onto the connector 18 and is able to deliver the fluid to a hydraulic servo actuator such as a brake caliper.

Also shown in FIG. 7 is the arrangement of the main conduit 36 having connected thereto the secondary conduits 37 formed inside the stem 19 and moving solid therewith.

Referring now to FIGS. 8 and 9, it can be seen that the hydraulic pump comprises a containment body provided with holes 49 normally closed by screws 29, said holes being used for a visual control of the fluid inside the reservoir 12 or for the drainage thereof.

The example of FIGS. 7-9 has been given with reference to the embodiment of the pump 1 shown in FIGS. 4-6a. However, it is understood that other embodiments of the pump 1 can be constructed, in particular of the type illustrated in FIGS. 1 to 3.

Advantageously, a brake for bicycles and motorcycles as illustrated in FIGS. 7-9 exhibits a shape of "radial" type, that is, with the axis "X" of the pump's piston being substantially perpendicular to the axis "Y" of handlebar 35, so that the brake is characterized by an advantageous lever ratio which allows the user, the breaking force being equal, to act with lesser force onto the lever 40 than in the case of different brakes, such as axial" pump-type, for example.

At the same time, a brake according to the invention has the reservoir 12 lined up with the cylinder of pump 1 and disposed between the cylinder and the handlebar 35.

FIG. 9 is an exploded view of the brake of FIGS. 7 and 8, showing in particular the shape of end 2c of body 2 complementary to the handlebar 35 for the fixing of the semicircular collar 45 above described.

Preferably, in the embodiment of FIG. 9, also the plug 38 of reservoir 12 is shaped complementarily to the handlebar 35, against which it is compressed through a clamping action exerted by the fastening members 48 between the portion 2c of body 2 and semicircular small collar 45.

Also viewable in FIG. 9 is the shape of the main body 2 having an open portion 2d into which there are inserted a main gasket 51, a spiral spring 21, the stem 19 and a pack of sealing elements 50, in this order.

The rod 7 is inserted, as already shown in FIG. 7, inside the pack of sealing elements 50, with the end 7a being engaged into a corresponding cavity 52 of stem 19.

The invention solves the problems encountered in the prior art and achieve the proposed objects.

In fact, the total volume and the weight of the pump, according to the invention, are remarkably reduced with respect to those of a traditional pump.

Such characteristics make it possible to assemble the pump in the most suited positions, for example on motorcycles or bicycles, so as not to hamper the movements of the driver and to concentrate the masses at such positions as to minimize the inertias and maximize the performance of the means in question.

Moreover, the means 13 for closing or opening the connection between the reservoir 12 and the cylindrical cavity 3—besides conferring the pump the compact construction which is provided with—allow closing with extreme rapidity the said connection and increasing the readiness and efficacy of the braking.

The invention thus conceived is evidently suited for industrial application; the same invention can also be subjected to several modifications and changes falling within the scope of the inventive idea; moreover, all the parts may be replaced by other elements technically equivalent.

While specific embodiments of the invention have been shown and described in detail to illustrate the application of the principles of the invention, it will be understood that the invention may be embodied otherwise without departing from such principles.

What is claimed is:

1. A hydraulic brake for bicycles and motorcycles comprising:
    a main body having a fixing portion to a handlebar;
    a cylinder formed inside said main body;
    a piston sliding within said cylinder to compress an operating fluid and drive a hydraulic actuator;
    a lever movable relative to the cylinder and operatively connected to said piston;
    a reservoir in fluid communication with said cylinder; and
    a deformable wall delimiting the reservoir to compensate for a variation of volume of the reservoir deriving from wear of one or more pads associated with said hydraulic actuator, said cylinder having an axial extension, said axial extension being extended between a first end proximate to said lever and a second end proximate to said fixing portion, said reservoir being disposed axially adjacent to said second end of the axial extension of the cylinder and substantially interposed between the second end of the axial extension of the cylinder and said fixing portion to the handlebar, said piston sliding from the first end of the axial extension of the cylinder towards said fixing portion, based on movement of said lever, wherein said cylinder comprises a cylindrical cavity having a cylindrical cavity longitudinal axis, said reservoir comprising a reservoir longitudinal axis, said reservoir longitudinal axis being aligned with said cylindrical cavity longitudinal axis, said cylindrical cavity being located at an axially spaced location from said reservoir with respect to an axial direction of said cylindrical cavity longitudinal axis and said reservoir longitudinal axis, whereby a space is provided between said reservoir and said cylinder cavity with respect to said axial direction of said cylindrical cavity longitudinal axis and said reservoir longitudinal axis, wherein said cylindrical cavity is arranged opposite said reservoir with respect to said axial direction of said cylindrical cavity longitudinal axis and said reservoir longitudinal axis.

2. A brake according to claim 1, wherein the axial extension of said cylinder is substantially perpendicular to an axis of the handlebar.

3. A brake according to claim 1, wherein said fixing portion of said main body is shaped complementarily to the handlebar.

4. A brake according to claim 1, further comprising a conduit for communication with said hydraulic actuator located on a side wall of the cylinder.

5. A brake according to claim 4, wherein said conduit for communication with the hydraulic actuator is located in proximity to said second end of the axial extension of the cylinder, said conduit extending in a radial direction with respect to said cylindrical cavity longitudinal axis and said reservoir longitudinal axis.

6. A hydraulic brake for bicycles and motorcycles comprising:
  a main body having a fixing portion for connecting said main body to a handlebar;
  a cylinder formed inside said main body, said cylinder comprising an axially extending portion, said axially extending portion having a first end portion and a second end portion, said second end portion being located adjacent to said fixing portion;
  a piston, at least a portion of said piston being arranged in said cylinder;
  a lever operatively connected to said piston, said first end portion being located adjacent to said lever;
  a reservoir; and
  a deformable wall delimiting the reservoir, said reservoir being disposed axially adjacent to said second end portion, said reservoir being arranged between said second end portion and said fixing portion, said piston being mounted for movement such that said at least said portion of said piston moves from said first end portion in a direction of said fixing portion based on movement of said lever, wherein said cylinder comprises a cylindrical cavity having a cylindrical cavity longitudinal axis, said reservoir comprising a reservoir longitudinal axis, said reservoir longitudinal axis being aligned with said cylindrical cavity longitudinal axis, said cylindrical cavity being located at an axially spaced location from said reservoir with respect to an axial direction of said cylindrical cavity longitudinal axis and said reservoir longitudinal axis, whereby a space is provided between said reservoir and said cylinder cavity with respect to said axial direction of said cylindrical cavity longitudinal axis and said reservoir longitudinal axis, wherein said cylindrical cavity is arranged opposite said reservoir with respect to said axial direction of said cylindrical cavity longitudinal axis and said reservoir longitudinal axis.

7. A brake according to claim 6, wherein actuation of said piston compresses an operating fluid and drives a hydraulic actuator, said lever being movable relative to the cylinder, said reservoir being in fluid communication with said cylinder, said deformable wall compensating for a variation of volume of the reservoir deriving from wear of one or more pads associated with said hydraulic actuator.

8. A brake according to claim 7, further comprising a conduit for communication with said hydraulic actuator located on a side wall of the cylinder.

9. A brake according to claim 8, wherein said conduit for communication with the hydraulic actuator is located adjacent to said second end, said conduit extending in a radial direction with respect to said cylindrical cavity longitudinal axis and said reservoir longitudinal axis.

10. A brake according to claim 6, wherein said axially extending portion is substantially perpendicular to a longitudinal axis of the handlebar.

11. A brake according to claim 6, wherein said fixing portion comprises a fixing portion surface having a shape that corresponds to a shape of the handlebar.

12. A hydraulic brake for bicycles and motorcycles comprising:
  a main body comprising a fixing portion for connecting said main body to a handlebar, a cylinder, a reservoir and a deformable wall delimiting the reservoir, said cylinder comprising an axially extending portion, said axially extending portion comprising a first end portion and a second end portion, said reservoir being disposed adjacent to said fixing portion, said reservoir being arranged between said second end portion and said fixing portion;
  a piston, at least a portion of said piston being arranged in said cylinder; and
  a lever operatively connected to said piston, said piston being mounted for movement such that said at least said portion of said piston moves from a position adjacent to said first end portion in a direction of said fixing portion based on movement of said lever, wherein said cylinder comprises a cylindrical cavity having a cylindrical cavity longitudinal axis, said reservoir comprising a reservoir longitudinal axis, said reservoir longitudinal axis being aligned with said cylindrical cavity longitudinal axis, said cylindrical cavity being located at an axially spaced location from said reservoir with respect to an axial direction of said cylindrical cavity longitudinal axis and said reservoir longitudinal axis, whereby a space is provided between said reservoir and said cylinder cavity with respect to said axial direction of said cylindrical cavity longitudinal axis and said reservoir longitudinal axis, wherein said cylindrical cavity is arranged opposite said reservoir with respect to said axial direction of said cylindrical cavity longitudinal axis and said reservoir longitudinal axis.

13. A brake according to claim 12, wherein actuation of said piston compresses an operating fluid and drives a hydraulic actuator, said lever being movable relative to the cylinder, said reservoir being in fluid communication with said cylinder, said deformable wall compensating for a variation of volume of the reservoir deriving from wear of one or more pads associated with said hydraulic actuator.

14. A brake according to claim 13, further comprising a conduit for communication with said hydraulic actuator located on a side wall of the cylinder.

15. A brake according to claim 14, wherein said conduit for communication with the hydraulic actuator is located adjacent to said second end, said conduit extending in a radial direction with respect to said cylindrical cavity longitudinal axis and said reservoir longitudinal axis.

16. A brake according to claim 12, wherein said axially extending portion is substantially perpendicular to a longitudinal axis of the handlebar.

17. A brake according to claim 12, wherein said fixing portion comprises a fixing portion surface having a contour that corresponds to a contour of the handlebar.

* * * * *